May 4, 1954  J. A. G. DODEMAN ET AL  2,677,306
PROJECTION INDICATOR FOR MEASUREMENT APPARATUS
Filed Dec. 12, 1950
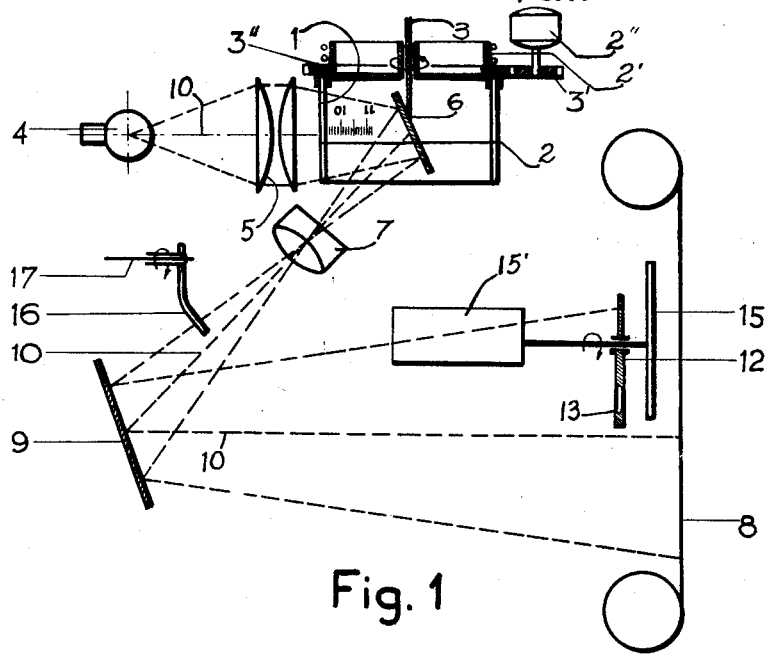
Fig. 1
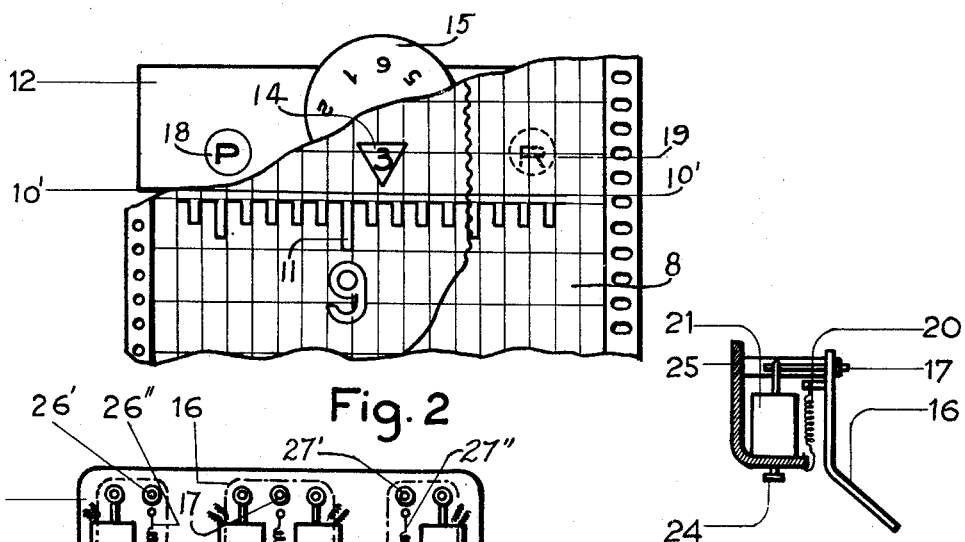
Fig. 2
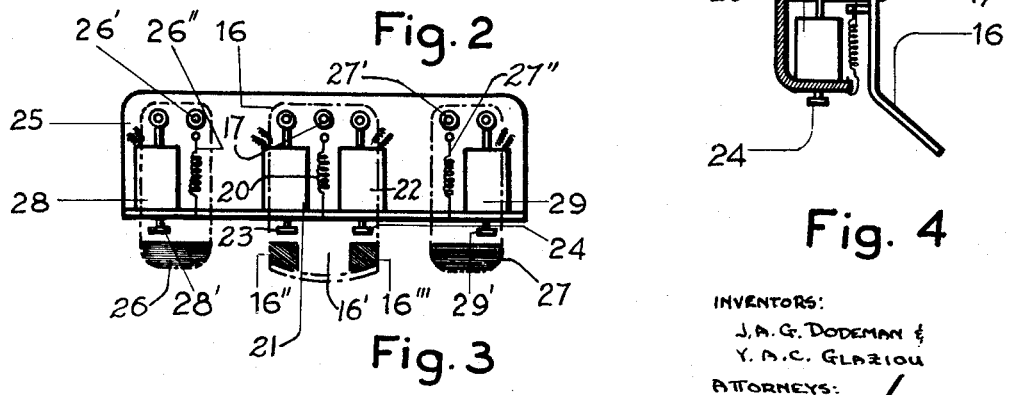
Fig. 3
Fig. 4
INVENTORS:
J. A. G. DODEMAN &
Y. A. C. GLAZIOU
ATTORNEYS:
Moore and Hall Patented May 4, 1954

2,677,306

UNITED STATES PATENT OFFICE 2,677,306

PROJECTION INDICATOR FOR
MEASUREMENT APPARATUS

Jean Amand Gaston Dodeman, Bagneux, and
Yves Alexandre Charles Glaziou, Paris,
France Application December 12, 1950, Serial No. 200,364

Claims priority, application France
December 13, 1949

5 Claims. (Cl. 88—24)

This invention relates to an improvement in the indicators, regulators and recorders, allowing the measurement of various magnitudes such as temperature, pressure, fluid flow, gases and other fluids concentration, and the like.

Such apparatuses include a pointer index moving in front of a scale indicating the magnitude to be measured or a recording style or pen translating in a diagram on a moving band of paper the fluctuations of the magnitude.

These apparatuses are permanently set up and, to allow an accurate reading at a more or less remote distance of the apparatus, it has already been suggested to increase the scale on the apparatus itself either, in using a repeating instrument, to translate the signs of the needle of the style or pen on a large sized screen which can be seen of any place, in a working shop for instance.

In the first case, the amplification of the scale is limited by the size of the apparatus itself and the second proposal is quite unsatisfactory since it requires the use of a frail medium such as a repeating instrument.

The object of the invention is to provide an apparatus of the above mentioned type allowing, with the use of simple means, to obtain on the travelling band of paper itself, an enlarged image of the scale, which can be observed at a fairly long distance.

The apparatus according to the invention is essentially characterized in that it includes a transparent or translucent band, carrying the measurement scale, which is directly or indirectly driven by a potentiometric torus of a quantity equal or proportional to the value of the magnitude to be measured, in front of an optical device adapted to project on the scale of the apparatus or on the registering band, with a given amplification, only the part which lies in the immediate vicinity of the graduation on the translucent band corresponding to the value of the measured magnitude.

The apparatus will advantageously include auxiliary devices indicating, by means of luminous signals, the various secondary factors, such as the qualitative discrepancies in relation with a given value of the measured magnitude, the end of the diagram card, the exhaustion of the feeding battery, and the like and/or in the case of apparatuses giving different directions, indicating with a luminous sign the numeral of the projected measurement.

By way of example, an embodiment of an apparatus according to the invention is hereafter described and illustrated in the annexed drawing.

Fig. 1 shows diagrammatically the optical device for the enlarged projection of the measurement scale on the diagram band.

Fig. 2 is a front view of a part of the paper band on which appears the enlarged image of the measurement scale, the band being partially torn away to show the accessory signalization devices.

Figs. 3, 4 show diagrammatically the controlling elements for these accessory devices.

In Fig. 1, the numeral 1 corresponds to a film carrying the measurement scale and mounted on a preferably cylindrical carrier 2, integrally driven with the potentiometric torus 2' which materialize the measurement, by a motor 2", the displacement angles varying in relation with the magnitude to be measured, said drive being performed through a toothed wheel 3' wedged to the shaft of the motor 2" and meshing with a toothed ring 3" which carries the potentiometric torus 2'.

The carrier 2, and thereby the film 1, revolves round a shaft 3 in front of a projecting device which consists of a lamp 4 and a condenser 5. The beam of rays, generated by the lamp 4, after crossing the condenser 5 and the film 1, is reflected by the plain mirror 6 carried by the axis 3, passes through the lens 7 and reproduces on the diagram paper 8, after being reflected on the second fixed mirror 9, the enlarged and reversed image of the part of the scale of the film corresponding to the desired measurement.

This scale, i. e. the graduation and the corresponding figures, is located in the upper part of the film 1, in such a way that the basis of said graduation is accurately in the axis 10 of the optical system and that the image 11 of the part of the film scale which is opposite the beam of rays is reproduced in a clear image on the diagram under the line 10'—10' (Fig. 2) at an enlarged scale, as a part only of the graduation of the film 1, located at either side of the graduation corresponding to the actual value to be measured.

As will be described hereunder, an index 14 is projected onto the band of paper 8, in the middle of its width, and as the graduation of the scale on the film 1 which corresponds to the actual value to be measured is in front of the axis 10, its enlarged image on the band 8 is located in front of the index 14.

In the case of registering apparatuses having several directions, it is advantageous to combine with the optical device a signalling device which will disclose on the diagram band a mark, a numeral for instance, indicating the corresponding direction.

This signalling device consists essentially of an opaque plate 12, with the window 13, and of a transparent disc 15, revolving round an horizontal axis and mechanically synchronized with the direction switch 15', said disc bearing for instance the numerals 1 to 6 indicating conventional directions. According to the direction interested by a given measurement, the corresponding numeral 3, for instance, takes place opposite the window 13 and the beam of rays flowing through the lower and transparent part of the film 1, projects a dark image of this numeral on the diagram.

If at the same time, the apparatus is to be used as a regulator, it includes a multicoloured screen 16, teetering round the axis 17 and controlled by the regulating device so as to shut out the luminous beam which throws light on the index 14. On account of the various colours of the screen 16, the index 14 takes a conventional colouring which shows at any moment to the operator the direction of the adjustment.

If, for instance, the apparatus has to give the temperature of a furnace and if, by convention, the red colour indicates an increase of the temperature above the allowable value, the regulating device shall start automatically and rotate the axis 17 at such an angle that the red section of the screen 16 takes place on the course of the luminous beam which, after being reflected over the mirror 9, passes through the window 13, the index 14 then appears in red on the paper.

It is also advantageous to provide the plate 12 with marks such as 18, 19 which will distinctly appear on the paper band 8 to draw the operator's attention on fortuitous events or on operations to be carried on, such as the exhaustion of the feeding battery (mark P) or the end of the paper band 8 (mark R).

The luminous beams passing through the marks 18 and 19 are shut out, when the apparatus works normally and when it is supplied with paper, by means of opaque screens 26, 27, which are not shown on Figs. 1, 2 so as not to overload them, but are shown on the Figure 3 which discloses the controlling device for the screens and for the translucent and multicoloured screen 16.

All these screens 16, 26, 27 are driven by plunger magnets, preferably mounted on the same carrier 25.

The screen 26, which swings round the axis 26' and is brought back to rest by the spring 26'' is controlled by the plunger 28' of the coil 28. At rest, the screen is opposite the mark 18 and frees it immediately when the measurement rheostat of the battery (not shown) reaches the end of its course and switches on the feeding contacts of the coil 28.

The screen 27 which swings round the axis 27' and is kept at rest opposite the mark 19 by the drawback spring 27'' is controlled by the plunger 29' of the coil 29. The feeding of the coil, i. e. the switching on of the feeding contacts (not shown) starts when the roll of paper 8 comes at its end and preferably a little sooner.

The screen 16 which teeters round the axis 17 is controlled by two magnets 21, 22, by means of their two plungers 23, 24 respectively, and is kept in a medium position by a spring 20.

The screen bears, for instance, a white transparent area 16', a green transparent area 16'' and a red transparent area 16''': the feeding of the coils 21, 22 is controlled by the regulating device, for instance in the following manner, admitting that the red colouring of the window 14 indicates a temperature above the working temperature of the furnace, and that the green colouring of the window 14 indicates a temperature below the working temperature.

If the apparatus registers a temperature below the allowable value, the regulating device starts the switching on of the feeding contacts of the coil 21 and the screen 16 will teeter contrary to the direction of the watch needles, for instance, to bring the area 16'' in the place of the area 16, thus colouring in green the luminous pencil passing through the window 13.

If the apparatus registers a temperature above the allowable value, the regulating device will start out the feeding of the coil 22, thus bringing the screen 16 to teeter in the direction of the needles of a watch, and bringing the area 16''' to cut out the luminous pencil, so that the mark opposite the window 13 will appear in red.

Though the object of the invention has been described with reference to a potentiometric indicator of temperatures, it must be understood that it can be applied also to all the indicators, potentiometric, regulators and recorders, with an electronic, a mechanical or an electromechanical driving.

What we claim is:

1. A multidirectional projection indicating measurement apparatus for registering various phenomenon on a travelling band of paper, comprising in combination a cylindrical shaped transparent support driven in accordance with the value of the phenomenon to be registered, an inversed scale radially arranged on said support, a first mirror disposed in the center of that support and inclined towards the bottom thereof, a source of light and a condenser arranged in front of said support and facing the scale and the said mirror, the axis of the said source and of the condenser being located in the plane determined by the lower ends of the graduations of the scale, a second mirror facing the said first mirror and inclined over the back face of the band of paper, a lens intermediate the mirrors and capable of inverting the rays issued from the first mirror, a direction switch placed behind the band of paper, a translucid disc rotatably connected to said switch and carrying indexes each of which corresponds to a given direction, a fixed opaque plate placed behind said disc and provided with a window, the said disc and plate being located above the axis of the beam reflected by the second mirror and illuminating the back face of the band of paper.

2. A multidirectional projection indicating measurement apparatus for registering various phenomenon on a travelling band of paper, comprising in combination a cylindrical shaped transparent support driven in accordance with the value of the phenomenon to be registered, an inversed scale radially arranged on said support, a first mirror disposed in the center of that support and inclined towards the bottom thereof, a source of light and a condenser arranged in front of said support and facing the scale and the said mirror, the axis of the said source and of the condenser being located in the plane determined by the lower ends of the graduations of the scale, a second mirror facing the said first mirror and inclined over the back face of the band of paper, a lens intermediate the mirrors and capable of inverting the rays issued from the first mirror, a direction switch placed behind the band of paper, a translucid disc rotatably connected to said switch and carrying indexes each of which corresponds to a given direction, a fixed opaque plate placed behind said disc and provided with a window, the said disc and plate being located above the axis of the beam reflected by the second mirror and illuminating the back face of the band of paper, a multicoloured screen interposed in the path of the upper part of the beam issued from the lens, the said screen being synchronized with the indexes on the disc to identify a given direction by the reference and by a given colour.

3. A multidirectional projection indicating measurement apparatus according to claim 2 further comprising at either sides of the disc, at least a transparent reference controlled by an opaque screen interposed between the opaque plate and the back face of the band of paper, the opaque screens and the multicoloured screen being controlled by a device comprising a support, a pivot for swivelling supporting each of the opaque screens by one of its upper corners and a pivot for swivellingly supporting the multicoloured screen intermediate its upper corners, a plunger magnet associated to each of the opaque screens, the upper end of the plunger of which being articulated on the free upper corner of said screen, a set of two plunger-magnets associated to the multicoloured screen, the upper ends of said magnets being pivotally connected to the respective upper corners of the said multicoloured screen, and a retracting spring between each of said screens and the support to maintain these screens in their inoperative positions when the corresponding plungers are at rest.

4. In a projection indicating measurement apparatus for registering on a travelling band of paper the diagram of fluctuations in value of a given phenomenon, comprising in combination a rotatable potentiometric torus angularly controlled in accordance with the actual value of said phenomenon, a transparent support integral with said torus, a scale carried by said support, a source of light in front of said scale and adapted to illuminate the graduation of said scale corresponding to the said actual value and a part thereof located at either side of said value, optical means adapted to project on to the whole width of the band of paper an enlarged image of the illuminated part of said scale, and a fixed index located in the middle of the width of the band of paper, whereby the enlarged image of the graduation of the scale corresponding to the actual value is located on the band of paper in front of said index and corresponds to the actual value registered on said band.

5. In a projection indicating measurement apparatus for registering on a travelling band of paper the diagram of fluctuations in value of a given phenomenon, comprising in combination a fixed axis, a potentiometric torus rotatably mounted on said axis and angularly controlled in accordance with the actual value of said phenomenon, a transparent support integral with said torus, an inversed translucent cylindrical scale carried by said support, a first mirror disposed in the center of the cylindrical scale and inclined towards the bottom thereof, a source of light, a condenser lens arranged between the source of light and the cylindrical scale and adapted to illuminate the graduation of said scale corresponding to the said actual value and a part thereof located at either side of said value, a second mirror facing the said first mirror and inclined over the back face of the said band of paper, a lens intermediate the mirrors, and a fixed index located in the middle of the width of said band of paper, the axis of the said source of light and of the said condenser passing through the lower end of the graduation of the scale which corresponds to the actual value, whereby an enlarged image of said illuminated portion is projected onto the whole width of the band of paper with the image of the graduation on the scale corresponding to the actual value in front of the said index.

References Cited in the file of this patent

UNITED STATES PATENTS

| Number | Name | Date |
|---|---|---|
| 1,074,260 | Guerrant | Sept. 30, 1913 |
| 1,357,731 | Schaper | Nov. 2, 1920 |
| 1,487,514 | Goss | Mar. 18, 1924 |
| 1,882,774 | Carroll | Oct. 18, 1932 |
| 1,939,161 | Bestelmeyer | Dec. 12, 1933 |
| 2,116,217 | Schwarz | May 3, 1938 |
| 2,191,045 | Slayton | Feb. 20, 1940 |
| 2,369,284 | Dale | Feb. 13, 1945 |